United States Patent
Brunet et al.

(10) Patent No.: US 7,924,903 B2
(45) Date of Patent: Apr. 12, 2011

(54) METHOD AND DEVICE FOR BLIND DEHOPPING

(75) Inventors: Daniel Brunet, Vauchretien (FR); Hervé Houix, Angers (FR); Thierry Guignard, Cholet (FR)

(73) Assignee: Thales (FR)

( * ) Notice: Subject to any disclaimer, the term of this patent is extended or adjusted under 35 U.S.C. 154(b) by 502 days.

(21) Appl. No.: 11/994,831

(22) PCT Filed: Jul. 5, 2006

(86) PCT No.: PCT/EP2006/063911
§ 371 (c)(1),
(2), (4) Date: Jul. 1, 2008

(87) PCT Pub. No.: WO2007/003652
PCT Pub. Date: Jan. 11, 2007

(65) Prior Publication Data
US 2008/0317100 A1    Dec. 25, 2008

(30) Foreign Application Priority Data
Jul. 5, 2005   (FR) .................................. 05 07142

(51) Int. Cl.
*H04B 1/00*   (2006.01)

(52) U.S. Cl. ........................................................ 375/132
(58) Field of Classification Search .................. 375/132, 375/134, 136–137, 324, 326
See application file for complete search history.

(56) References Cited

U.S. PATENT DOCUMENTS

| | | | |
|---|---|---|---|
| 5,339,331 A * | 8/1994 | Beauchamp et al. ......... 375/137 |
| 5,970,400 A * | 10/1999 | Dwyer ......................... 455/254 |
| 6,188,715 B1 | 2/2001 | Partyka |
| 6,854,140 B2 * | 2/2005 | Bartels et al. ..................... 5/601 |
| 7,035,311 B2 * | 4/2006 | Nohara et al. ................ 375/132 |
| 2004/0137849 A1 | 7/2004 | Kloper et al. |

* cited by examiner

*Primary Examiner* — Khanh C Tran
(74) *Attorney, Agent, or Firm* — Lowe Hauptman Ham & Berner, LLP

(57) ABSTRACT

A method and device are disclosed for real-time characterization of frequency-hopping networks, in which the signal to be characterized is converted into a digital signal and the frequency characteristics of the signal are determined. A frequency hop is sought for synchronization with the start of the transmission. The frequency is tracked and the central frequency Fc of the required transmission channel is sought. A delay is applied to the digitized samples during the tracking phase. The samples corresponding to the signal step are determined on the basis of the delayed samples and the identified central frequency.

6 Claims, 2 Drawing Sheets

METHOD AND DEVICE FOR BLIND DEHOPPING

CROSS-REFERENCE TO RELATED APPLICATIONS

The present application is based on International Application No. PCT/EP2006/063911, filed on Jul. 5, 2006, which in turn corresponds to French Application No. 07 07142, filed on Jul. 5, 2005, and priority is hereby claimed under 35 USC §119 based on these applications. Each of these applications are hereby incorporated by reference in their entirety into the present application.

FIELD OF THE INVENTION

The invention relates to a method and a device which enable, notably, the interception and characterization of signals in frequency-hopping networks.

BACKGROUND OF THE INVENTION

Technical analysis of the data transmitted during a frequency-hopping communication requires the implementation of de-hopping processing which enables the chaining of the data transmitted in each step.

In general, the principle of the device and the method which enable de-hopping is as follows:

A plurality of elementary 40 MHz "slave" channels are associated in parallel with a 40 MHz "master" channel, Tracking algorithms associated with signal processing algorithms are integrated into an adapted programmable circuit, for example of the FPGA (Field Programmable Gate Array) type, A multi-channel reception structure enables the management of the elementary channels.

The technical problems to be resolved are, notably:

Interception and characterization of the frequency-hopping transmissions,

Real-time tracking of the frequency-hopping steps of the communication concerned, Reconstitution of the data stream, Decoding of the transmitted information.

The principle of detection of frequency-evasion or EVF networks has hitherto been based on the parallel implementation of elementary narrowband radiometers or energy detectors.

SUMMARY OF THE INVENTION

The invention is based on a new approach, which enables real-time processing of the signals to be characterized in frequency-hopping networks.

The invention relates notably to a method for real-time characterization of frequency-hopping networks, in which the signal to be characterized is converted into a digital signal and the frequency characteristics of the signal are determined, characterized in that it comprises at least the following steps:

a frequency hop is searched for synchronization with the start of the transmission, the frequency is tracked and the central frequency Fc of the required transmission channel is sought, a delay is applied to the digitized samples during the tracking phase, the samples corresponding to the signal step are determined on the basis of the delayed samples and the identified central frequency.

The invention also relates to a device for real-time characterization of frequency-hopping networks, comprising a converter of the signal to be characterized into a digital signal, characterized in that it comprises, in combination, at least the following elements:

A device adapted to introduce a delay into the received signal,

A device for tracking and determining the frequency characteristics of the signal, A de-hopping device which receives the delayed signal and the identified central frequency in order to determine the characteristics of the sought frequency-hopping network.

The invention offers, notably, the following advantages. The digital data transmitted in packets in the EVF steps (frequency-hopping modulations) can be chained without knowing the frequency law of the EVF.

In the context of communications involving a plurality of EVF networks, the device according to the invention enables, notably, the tracking and chaining of the data transmitted in the steps of an EVF over the totality of the very high frequency (VHF) band, tactical (2×40 MHz configuration, for example), or ultra-high frequency (UHF), aero (5×40 MHz configuration). The architecture of the device according to the invention is modular.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

To provide a better understanding of the invention, the example is shown in the case of a radio software structure. The examples which follow are presented by way of illustration and are in no way limiting in the context of an implementation of the invention in a programmable component such as an FPGA (Field Programmable Gate Array).

In this case, the method comprises an FPGA image-loading step ("real-time digital processing") and "supervision" software to configure the links between the different components, according to steps known to the person skilled in the art.

The algorithms described are valid for single-channel and multi-channel mode applications. In multi-channel mode, some of the algorithms may simply perform a remote master function.

Figure 1:
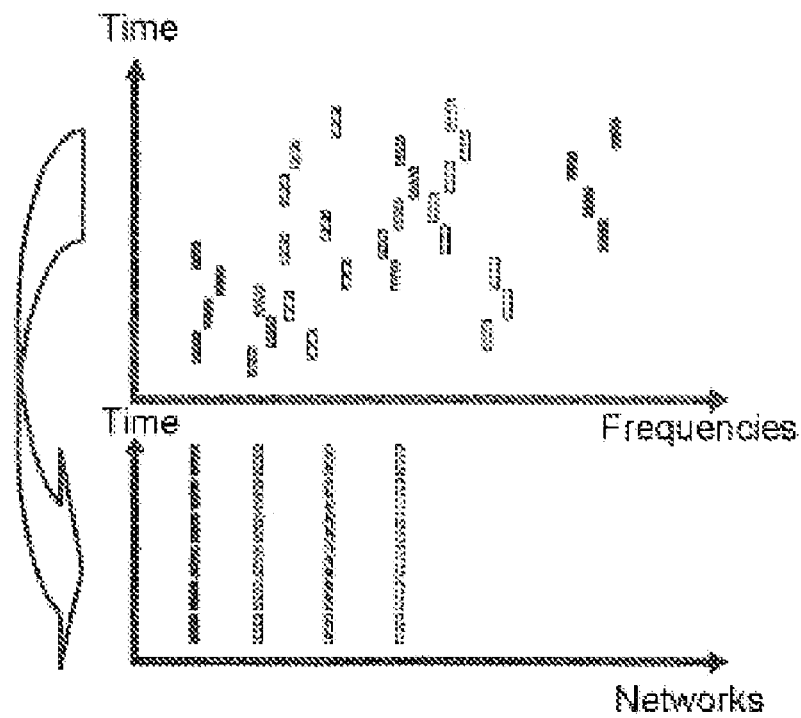
FIG. 1 shows the processing and de-hopping principle.

FIG. 1 shows the de-hopping processing principle in a time-frequency diagram.

Figure 2:
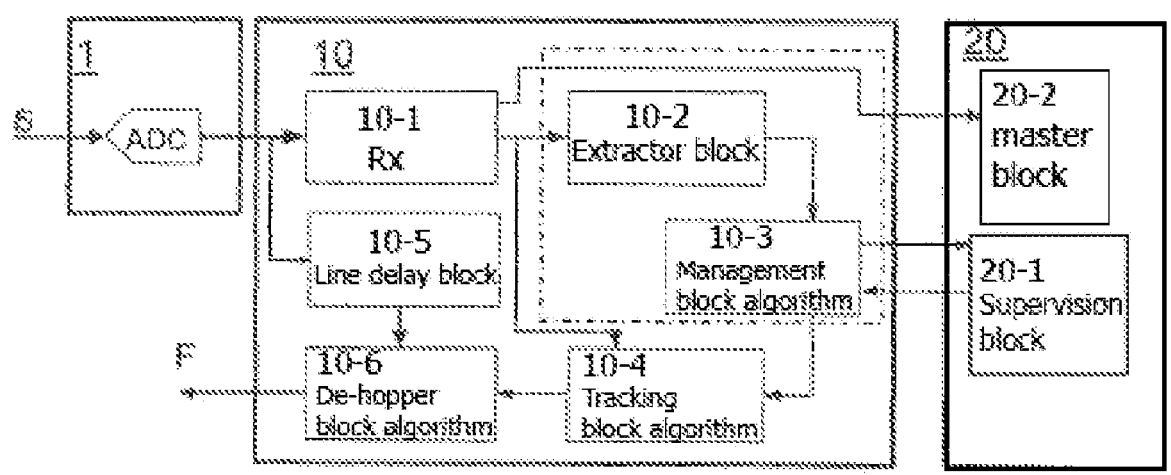
FIG. 2 shows an example of IP FPGA modules integrated into a reception channel to enable the de-hopping of the 40 MHz frequency-hopping networks.

FIG. 2 shows an example of FPGA modules integrated into each channel of a communications system to enable de-hopping of the frequency-hopping networks, for example at 40 MHz.

The principle of the blind de-hopper according to the invention entails, notably:
- Implementation in parallel of a plurality of elementary 40 MHz channels, on the principle of one master and x slave channels,
- Application of real-time digital processing of the signal to enable tracking of the frequency-hopping or EVF networks concerned and the generation of a baseband sample flow,
- Application of technical analysis processing of the flow of samples to chain the digital data transmitted in the EVF steps (frequency-hopping network steps).

The device comprises notably a conversion device 1 for the signals S received in the receiver, the converted signals then being transmitted to a programmable circuit 10 of the FPGA type and a master processor 20.

The programmable circuit block, FPGA, comprises, notably:

10-1 A block Rx, combining, notably, a plurality of functions: digital transposition functions, Fast Fourier transformation functions, shaping-optimization functions, 10-2 An extractor block.
This module combines, notably, an EVF frequency-hopping network step start and step end extraction function. This function enables, notably, the master block 20-2 to characterize the digitized spectrum to extract from it the characteristics of the different EVFs present in the spectrum.

In the exemplary embodiment, the characteristics for each EVF found are, for example, the step duration HT and the period of the EVF HCT.

10-3 A Management block algorithm
This module enables, notably, routing of the signals according to the single-channel or multi-channel mode. It comprises, for example, p reception channels at 40 MHz. In the case of the single-channel mode, the management block algorithm communicates directly with the supervision block 20-1 of the master.

In the case of the multi-channel mode, p channels, the manager communicates with the master FPGA. The latter collects all of the information originating from the management block algorithms of the p channels and communicates with the supervision block 20-1 of the master.

10-4 A tracking block algorithm
This module combines, notably, frequency-hop detection and frequency-hop tracking functions.
It seeks the required EVF in order to synchronize with the step start of the latter. Notably, it performs the function of finding the central frequency of the transmission channel of the sought EVF.

10-5 A line delay block
This module comprises, notably, the delay line functions. It stores the samples digitized during the initial tracking phase.

10-6 A de-hopper block algorithm
This module combines, notably, downward digital conversion functions. At its input, it receives the central frequency Fc of the transmission channel found by the tracker block and the delayed samples.

At the module output, the samples corresponding to the EVF step of the transmission channel are obtained.

The sample stream F obtained in the de-hopper is then transmitted to different processing and analysis devices known to the person skilled in the art, the function of which is, notably, to reconstitute the data stream transmitted during the EVF communication.

The method according to the invention is carried out, for example, in the following manner: the RF signal is first converted into a digital signal.

A first phase characterizes the spectrum of the digital signal in order to extract from it the RF radio frequency signals, which are either fixed-frequency or frequency-evasion signals. The spectrum of the digital signal is implemented by the block 10-1.

The characteristics of the RF signals are defined as follows: the frequency value of the carrier for a fixed frequency, the step duration and step period for a frequency-evasion RF signal. This characterization phase is implemented, for example, in the programmable circuit FPGA by the block algorithm, 10-1, and the extraction block, 10-2, then in the supervision processor, 10-7.

After the characterization phase, the de-hopping phase is instigated, 10-6.

From the spectrum originating from the block 10-1 and the step duration and period information transmitted from the supervision to the FPGA, the tracking algorithm (tracking algorithm 10-4) synchronizes with each frequency evasion RF signal step start.

During these synchronizations, the digital signal originating from the conversion block is stored in a delay line, 10-5. Once the synchronization is completed, the block 10-6 containing the de-hopping algorithm receives the value of the central frequency Fc from the tracking block, 10-4, and the digital signal Fn from the delay line. The de-hopping algorithm implements a filtering on the frequency-evasion RF signal channel for a recording. The delay line enables the time lost by the synchronization to be made up.

According to one embodiment, the invention comprises a function (scrambler via pseudo-relay) enabling modification of the steps of a communication. This function enables, notably, modification of the network synchronizations in a zone scrambling context with a plurality of communications in digitized fixed frequency (FN) or frequency evasion (EVF).

In a communications system, the station 20 enabling the signal modification acts as a pseudo-relay between a master station and one or more slave stations. In order to establish communications, the frequency-hopping devices must transmit synchronization sequences and the digitized-frequency data communications require communication protocols.

During the method:
- The synchronizing calls are intercepted during a phase of initial synchronization or resynchronization of the frequency-hopping communications,
- Only the synchronization phase is retransmitted with a delay t.

On reception (receiver 21) of this pseudo-synchronization phase transmitted by the scrambler during the EVF network resynchronization phase, the master and slave(s) of the network cannot synchronize with one another.

Figure 3:
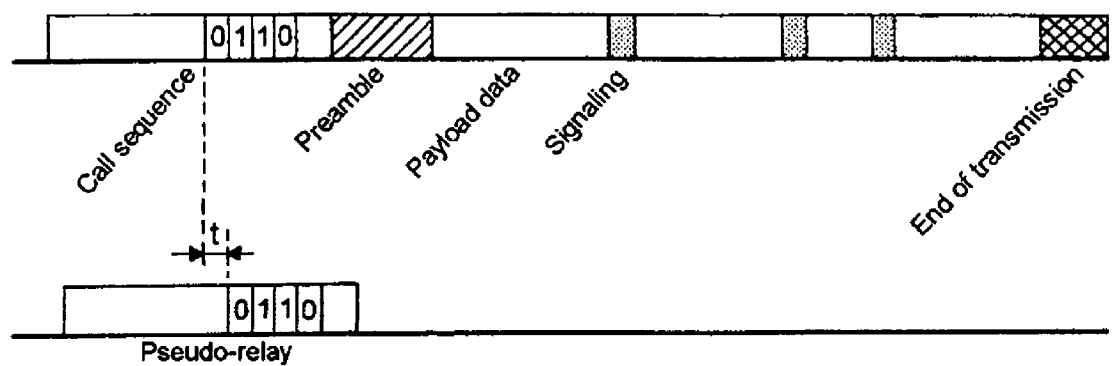
FIG. 3 shows the principle of a signal modification by a pseudo-relay device.
Figure 4:
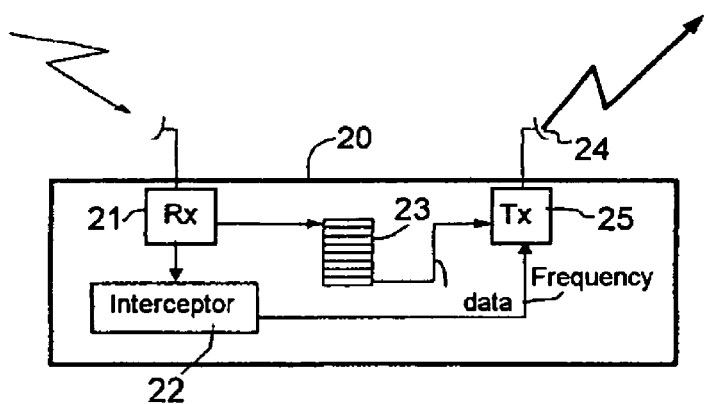
FIG. 4 shows a pseudo-relay device which enables signal modification.

FIG. 3 shows a synopsis of an architecture which enables the implementation of this function.

The functional architecture of the device comprises, for example:
- A high-speed, multi-channel interceptor 22 associated with a buffer memory 23 and a directional antenna 24,
- A power transmitter 25 associated with the directional antenna.

The device comprises, notably:

A reception module, 21, enabling transposition of the 70 MHz IF band electrical radio spectrum to be digitized onto a 40 MHz bandwidth, A signal-acquisition digital processing, 22, which implements a fast Fourier transformation FFT with synchronization with the synchronization steps or bursts, then stores the digitized synchronization phases, A programmable delay t is applied to the synchronization phases before retransmission, A frequency transposition of the delayed signal (carried out by the element 25) enabling notably the transposition of the signal in the electrical radio spectrum, An amplifier (built into the module 25) adapted to amplify the scrambling signal.

The different phases can be summarized in the table below

| Phases | Actions | Consequences |
|--------|---------|--------------|
| 1 | Scrambling of the zone through defensive scrambling | The devices require resynchronization |
| 2 | On arrival of the synchronizing call, the pseudo-relay retransmits the call sequence | The devices of the target networks begin to synchronize with one another |
| 3 | The pseudo-relay is stopped at the end of the call sequence | The devices of the target networks receive payload data, but delayed. The communication is rejected |

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for real-time characterization of frequency-hopping networks, in which a signal to be characterized is converted into a digital signal and the frequency characteristics of the signal are determined, comprising the following steps:
    searching a frequency hop for synchronization with the start of a transmission,
    tracking the frequency and searching the central frequency Fc of a required transmission channel,
    applying a delay to digitized samples during the tracking phase,
    determining the samples corresponding to the search step on the basis of the delayed samples and the identified central frequency.

2. The method as claimed in claim 1, wherein the duration and period of the steps are characterized in the case of a frequency-hop evasion (EVF).

3. The method as claimed in claim 1, wherein a programmable circuit of the FPGA (Field Programmable Gate Array) type is used.

4. The method as claimed in claim 1, wherein the frequency is equal to 40 MHz.

5. The method as claimed in claim 1, comprising a stage in which the synchronization of the networks is modified in a context where a plurality of communications exist, and comprising at least the following steps:
    intercepting the synchronizing calls during an initial synchronization phase or a resynchronization phase,
    retransmitting the resynchronization phase with a delay t.

6. A device for real-time characterization of frequency-hopping networks, comprising a converter of a signal to be characterized into a digital signal, comprising, in combination, at least the following elements:
    a device adapted to introduce a delay into the received signal,
    a device for determining frequency characteristics of the signal,
    a de-hopping device which receives the delayed signal and a central frequency in order to determine the characteristics of the sought frequency-hopping network.

* * * * *